United States Patent [19]

Huang

[11] Patent Number: 5,554,803

[45] Date of Patent: Sep. 10, 1996

[54] TUNABLE TIRE PRESSURE INDICATOR

[76] Inventor: Tien-Tsai Huang, No. 4-2, Lane 30, Wu-Chang St., Pan-Chiao City, Taipei Hsien, Taiwan

[21] Appl. No.: 496,322

[22] Filed: Jun. 29, 1995

[51] Int. Cl.⁶ .................................................. B60C 23/02
[52] U.S. Cl. ........................................................ 73/146.8
[58] Field of Search ............................... 73/146.3, 146.8; 340/442, 443, 444, 445, 447

[56]  References Cited

U.S. PATENT DOCUMENTS

| | | | |
|---|---|---|---|
| 1,856,199 | 5/1932 | Tagle et al. | 73/146.3 |
| 3,906,988 | 9/1975 | Mottram | 73/146.3 |
| 3,910,120 | 10/1975 | Martin | 73/146.8 |
| 5,289,161 | 2/1994 | Huang | 340/447 |

*Primary Examiner*—Richard Chilcot
*Assistant Examiner*—William L. Oen
*Attorney, Agent, or Firm*—Oblon, Spivak, McClelland, Maier, & Neustadt, P.C.

[57] ABSTRACT

A tunable tire pressure indicator includes an elongated hollow casing and a valve-actuating member mounted to an upper end of the casing. A piston is provided movably in the casing near the valve-actuating member. A plug unit is mounted in a lower end of the casing. A spring is provided in the casing between the piston and the plug unit. A pressure indicating rod is disposed in the casing. The piston pushes the rod to extend out of the casing through the plug unit against action of the spring to provide a tire pressure reading in response to pressure entering the casing. The plug unit includes a movable member formed with a passage to permit the rod to extend slidably therethrough and to permit rotation of the movable member with the rod, and a stationary member mounted securely in the lower end of the casing and formed with a through-hole larger than cross-section of the rod to permit passage of the rod therethrough. The movable member is coupled adjustably and rotatably to the stationary member to permit adjustment in distance between the movable member and the piston to adjust initial spring force of the spring. Tuning of the tire pressure indicator to obtain a precise tire pressure reading can be achieved by adjusting the initial spring force of the spring.

3 Claims, 5 Drawing Sheets

TUNABLE TIRE PRESSURE INDICATOR

BACKGROUND OF THE INVENTION

1. Field of the Invention

This invention relates to a tire pressure indicator, more particularly to a tunable tire pressure indicator capable of providing a precise tire pressure reading.

2. Description of the Related Art

A conventional tire pressure indicator, as shown in FIG. 1 and 2, includes an elongated hollow casing 10, a valve-actuating member 11, a piston 12, a plug unit 13, a spring 14 and a pressure indicating rod 15.

The casing 10 has upper and lower end portions. The valve-actuating member 11 is mounted to the upper end portion of the casing 10 and has a nozzle 111 that is adapted to actuate an inflating valve member of a tire (not shown) when the valve-actuating member 11 is connected to the inflating valve member, thereby discharging air from the tire into the casing 10. The piston 12 is mounted movably in the casing 10 adjacent to the valve-actuating member 11 and has a diameter-reduced protrusion 121 projecting downwardly from a bottom side thereof.

The plug unit 13 is mounted in the lower end portion of the casing 10 and includes a cylindrical body which has a diameter-reduced lower portion 131 and a passage 132 of rectangular cross-section. A mounting unit includes a pair of spaced mounting arms 133 which project from a top side of the cylindrical body and which confine a channel communicated with the passage 132. After the cylindrical body has been inserted into the casing 10, the bottom end of the casing 10 is folded inwardly to clip tightly the lower portion 131 of the cylindrical body in order to fix the plug unit 13 in the casing 10. The spring 14 is provided in the casing 10, and has its upper end sleeved on the protrusion 121 of the piston 12 and its lower end sleeved on the mounting arms 133 in order to maintain movement of the spring 14 along a desired direction. The pressure indicating rod 15 is disposed within the spring 14, and has a lower end portion extending slidably through the passage 132 of the cylindrical body and an upper end portion provided with a block 151 to retain the pressure indicating rod 15 within the casing 10.

When the valve-actuating member 11 is coupled with an inflating valve member of a tire to open the inflating valve member, air from the tire can drive the piston 12 against action of the spring 14 in order to push the pressure indicating rod 15 to extend out of the casing 10. Thus, a tire pressure reading can be obtained on the exposed lower end portion of the pressure indicating rod 15 in response to pressure entering the casing 10 via the valve-actuating member 11.

The conventional tire pressure indicator has several drawbacks. For example, when the spring 14 within the casing 10 of the conventional tire pressure indicator experiences fatigue after long-term use, a precise tire pressure reading cannot be obtained from the conventional tire pressure indicator. In addition, during manufacture, when the conventional tire pressure indicator is tested to have an error that is not within a tolerable range, this product has to be dismantled manually to replace the spring 14.

SUMMARY OF THE INVENTION

Therefore, the main objective of this invention is to provide a tire pressure indicator which is tunable by adjusting initial spring force of a spring thereof so as to obtain a precise tire pressure reading even if the tire pressure indicator is used for a long time or is tested to have an error that is not within a tolerable range after manufacture.

According to this invention, a tunable tire pressure indicator includes an elongated hollow casing, a valve-actuating member, a piston, a plug unit, a biasing member and a pressure indicating rod.

The casing has upper and lower end portions. The valve-actuating member is mounted to the upper end portion of the casing and is adapted to be connected to an inflating valve member of a tire. The piston is provided movably in the casing adjacent the valve-actuating member. The plug unit is mounted in the lower end portion of the casing. The biasing member is provided in the casing between the piston and the plug unit. The pressure indicating rod is disposed in the casing. The piston pushes the pressure indicating rod to extend out of the casing through the plug unit against action of the biasing member so as to provide a tire pressure reading in response to pressure entering the casing via the valve-actuating member.

The plug unit includes a movable member and a stationary member. The movable member is formed with an axial passage to permit the pressure indicating rod to extend slidably therethrough and to permit rotation of the movable member with the pressure indicating rod. The biasing member abuts against the movable member. The stationary member is mounted securely in the lower end portion of the casing, and is formed with an axial through-hole larger than cross-section of the pressure indicating rod to permit passage of the pressure indicating rod therethrough. The plug unit further includes coupling means for coupling adjustably and rotatably the movable member to the stationary member to permit adjustment in distance between the movable member and the piston to adjust correspondingly initial spring force of the biasing member.

Thus, tuning of the tire pressure indicator to obtain a precise tire pressure reading can be achieved by adjusting the initial spring force of the biasing member.

BRIEF DESCRIPTION OF THE DRAWINGS

Other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
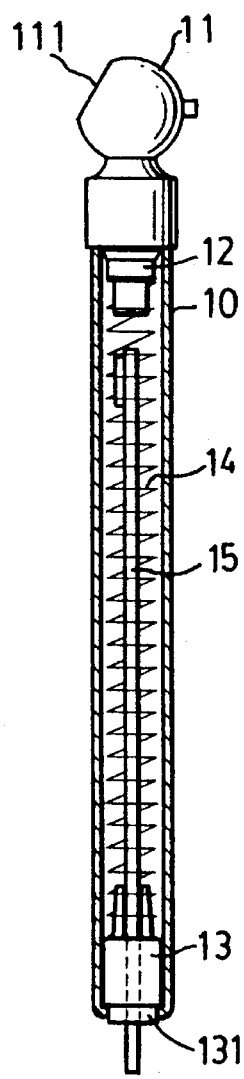
FIG. 1 is a sectional view showing a conventional tire pressure indicator.
Figure 2:
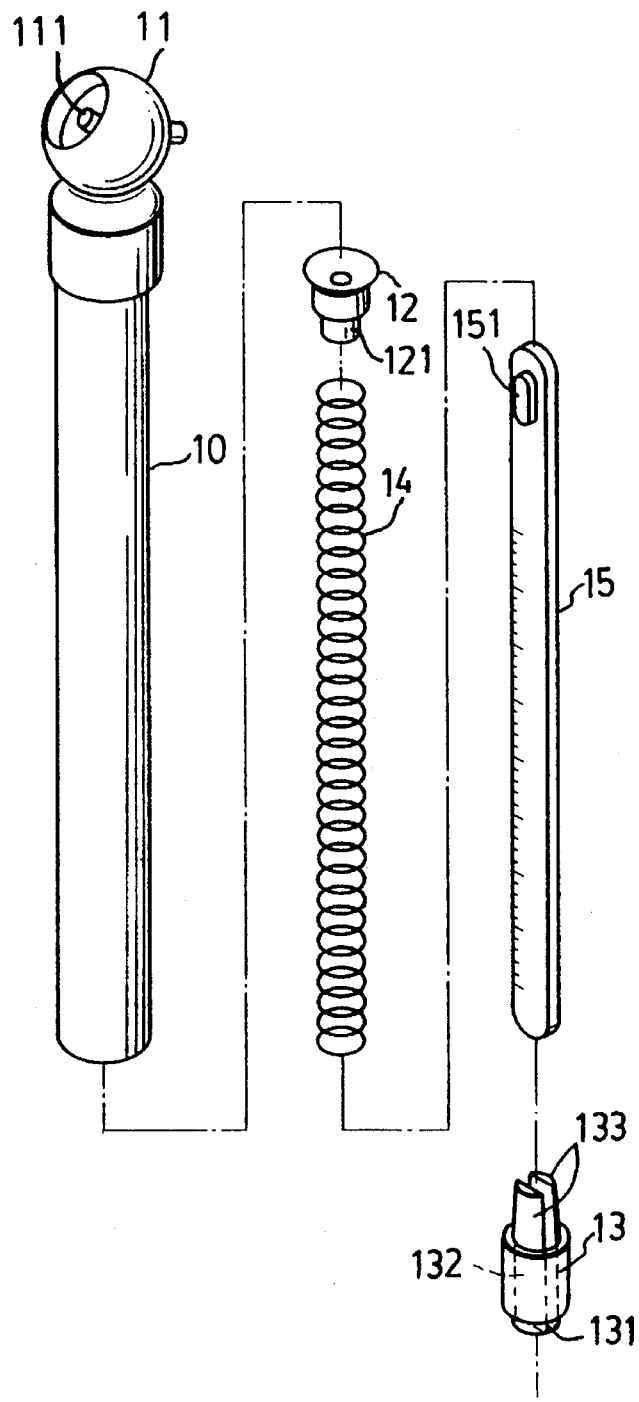
FIG. 2 is an exploded view showing the conventional tire pressure indicator.
Figure 3:
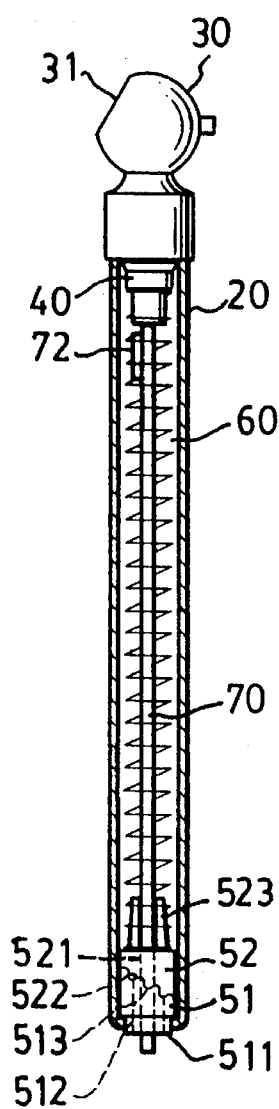
FIG. 3 is a sectional view showing the first preferred embodiment of a tunable tire pressure indicator of this invention.
Figure 4:
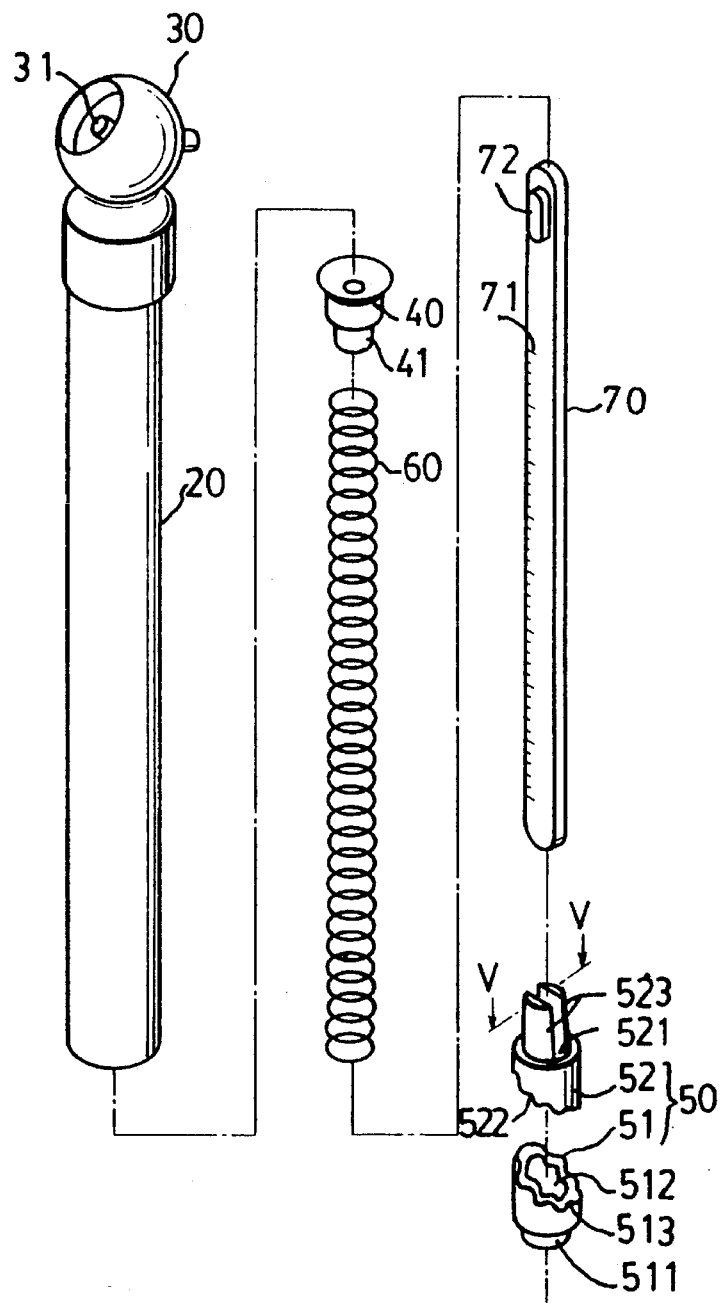
FIG. 4 is an exploded view showing the tunable tire pressure indicator according to the first embodiment of this invention.

Referring to FIGS. 3 and 4, the first preferred embodiment of a tunable tire pressure indicator according to this invention includes an elongated hollow casing 20, a valve-actuating member 30, a piston 40, a plug unit 50, a biasing member 60 and a pressure indicating rod 70. It is noted that similar parts in the following different embodiments are denoted by similar reference numbers.

The casing 20 has upper and lower end portions.

The valve-actuating member 30 is mounted securely to the upper end portion of the casing 20 and has a nozzle 31 adapted to open an inflating valve member of a tire (not shown) in a known manner when the valve-actuating member 30 is coupled with the inflating valve member, thereby discharging air from the tire into the casing 20.

The piston 40 is provided movably in the casing 20 adjacent the valve-actuating member 30 and has a diameter-reduced protrusion 41 projecting downwardly therefrom.

The plug unit 50 is mounted in the lower end portion of the casing 20.

The biasing member 60 in this embodiment is a spring which is provided in the casing 20 between the piston 40 and the plug unit 50.

The pressure indicating rod 70 has a rectangular cross section and a set of measuring marks 71 formed on one side face thereof. The pressure indicating rod 70 is disposed in the casing 20 inside the biasing member 60 and has its lower end portion extending out of the casing 20 through the plug unit 50 so as to provide a tire pressure reading in a known manner, and its upper end portion formed with an outwardly projecting block 72 in order to retain the pressure indicating rod 70 in the casing 20.

The plug unit 50 includes a stationary member 51 which is mounted in the lower end portion of the casing 20, a movable member 52 disposed within the casing 20 above the stationary member 51, and a coupling means for coupling adjustably and rotatably the movable member 52 to the stationary member 51 to permit adjustment in distance between the movable member 52 and the piston 40.

The stationary member 51 is a cylindrical half which is formed with a diameter-reduced lower portion 511, an inclined top end, and an axial through-hole 512 larger than the cross-section of the pressure indicating rod 70 to permit passage of the pressure indicating rod 70 therethrough. The outer diameter of the stationary member 51 is exactly equal to the inner diameter of the casing 20 in order to position the stationary member 51 within the casing 20. In addition, the bottom end of the casing 20 is folded inwardly to clip tightly the lower portion 511 for further positioning of the stationary member 51 in the casing 20.

The movable member 52 is a complementary cylindrical half which is formed with an inclined bottom end that faces the inclined top end of the stationary member 51, and an axial passage 521 substantially equal to the cross-section of the pressure indicating rod 70 to permit the pressure indicating rod 70 to extend slidably therethrough. The outer diameter of the movable member 52 is slightly smaller than the inner diameter of the casing 20 so that rotation of the pressure indicating rod 70 results in rotation of the movable member 52. The movable member 52 further has a mounting unit which consists of a pair of mounting arms 523 that project upwardly from a top side of the movable member 52 and that are spaced apart from each other to confine a channel in alignment with the axial passage 521 to permit passage of the pressure indicating rod 70 therethrough. The biasing member 60 has its upper end sleeved on the protrusion 41 of the piston 40 and its lower end sleeved on the mounting arms 523 of the movable member 52, thereby maintaining movement of the biasing member 60 along a desired direction. When the valve-actuating member 30 is coupled with an inflating valve member of a tire to open the inflating valve member, air from the tire can drive the piston 40 against action of the biasing member 60 to push the pressure indicating rod 70 to extend out of the casing 20 through plug unit 50. In this way, the exposed lower end portion of the pressure indicating rod 70 can provide a tire pressure reading in response to pressure entering the casing 20 via the valve-actuating member 30.

Figure 5:
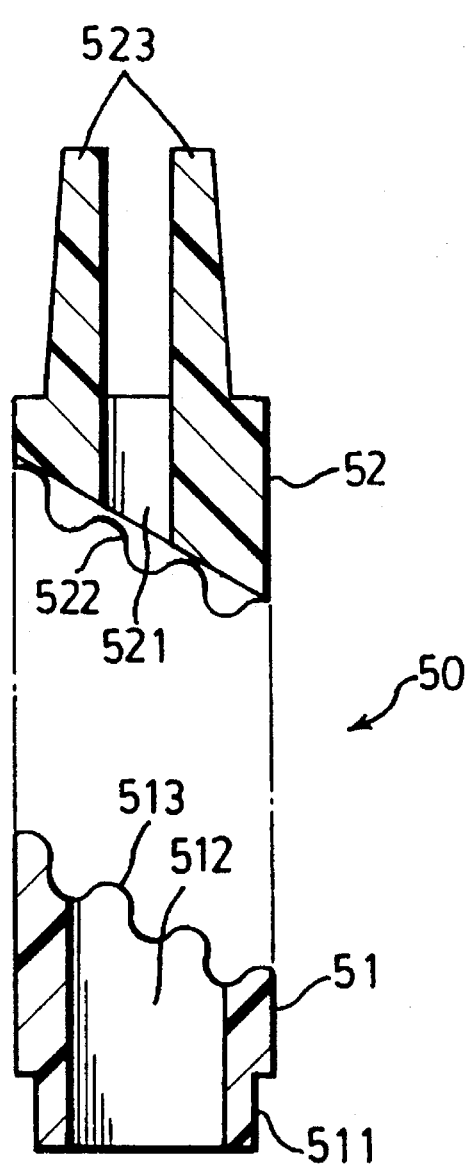
FIG. 5 is a sectional view, taken along the line V—V of FIG. 4, showing a plug unit of the tunable tire pressure indicator according to the first embodiment of this invention.

The coupling means, as shown in FIGS. 4 and 5, includes a plurality of first teeth 513 that project axially from the inclined top end of the stationary member 51 and that provide the inclined top end with a wavy end face, and a plurality of second teeth 522 that project axially from the inclined bottom end of the movable member 52 and that provide the inclined bottom end with a wavy end face.

Figure 6:
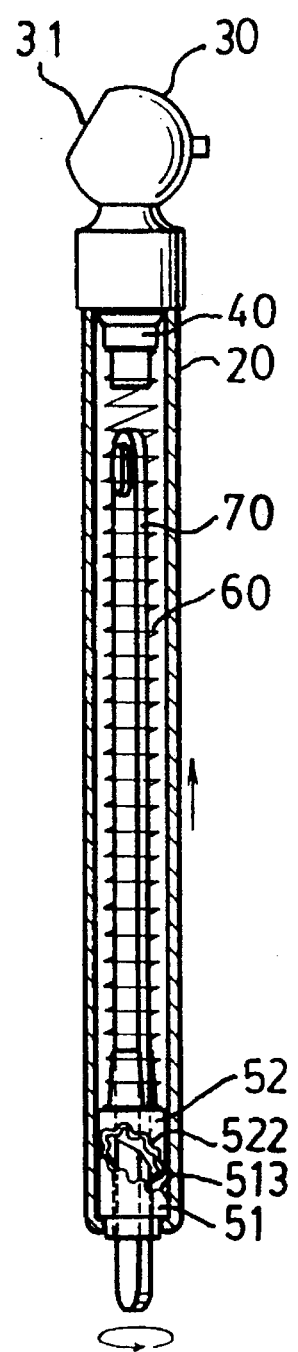
FIG. 6 is a schematic view illustrating how the plug unit is driven to tune the tunable tire pressure indicator in accordance with the first embodiment of this invention.

When the biasing member 60 experiences fatigue after long-term use, or when the tunable tire pressure indicator is tested to have an error that is not within a tolerable range after manufacture, the pressure indicating rod 70 can be rotated axially, as shown in FIG. 6, to rotate axially the movable member 52. In this way, the second teeth 522 can slide along the first teeth 513 to vary contact points between the stationary and movable members 51, 52 to permit adjustment in distance between the movable member 52 and the piston 40, thereby adjusting correspondingly initial spring force of the biasing member 60. Thus, tuning of the tunable tire pressure indicator to obtain a precise tire pressure reading can be achieved by adjusting the initial spring force of the biasing member 60. Accordingly, the tunable tire pressure indicator can be used for a long period of time and can be manufactured easily.

Figures 7, 8:
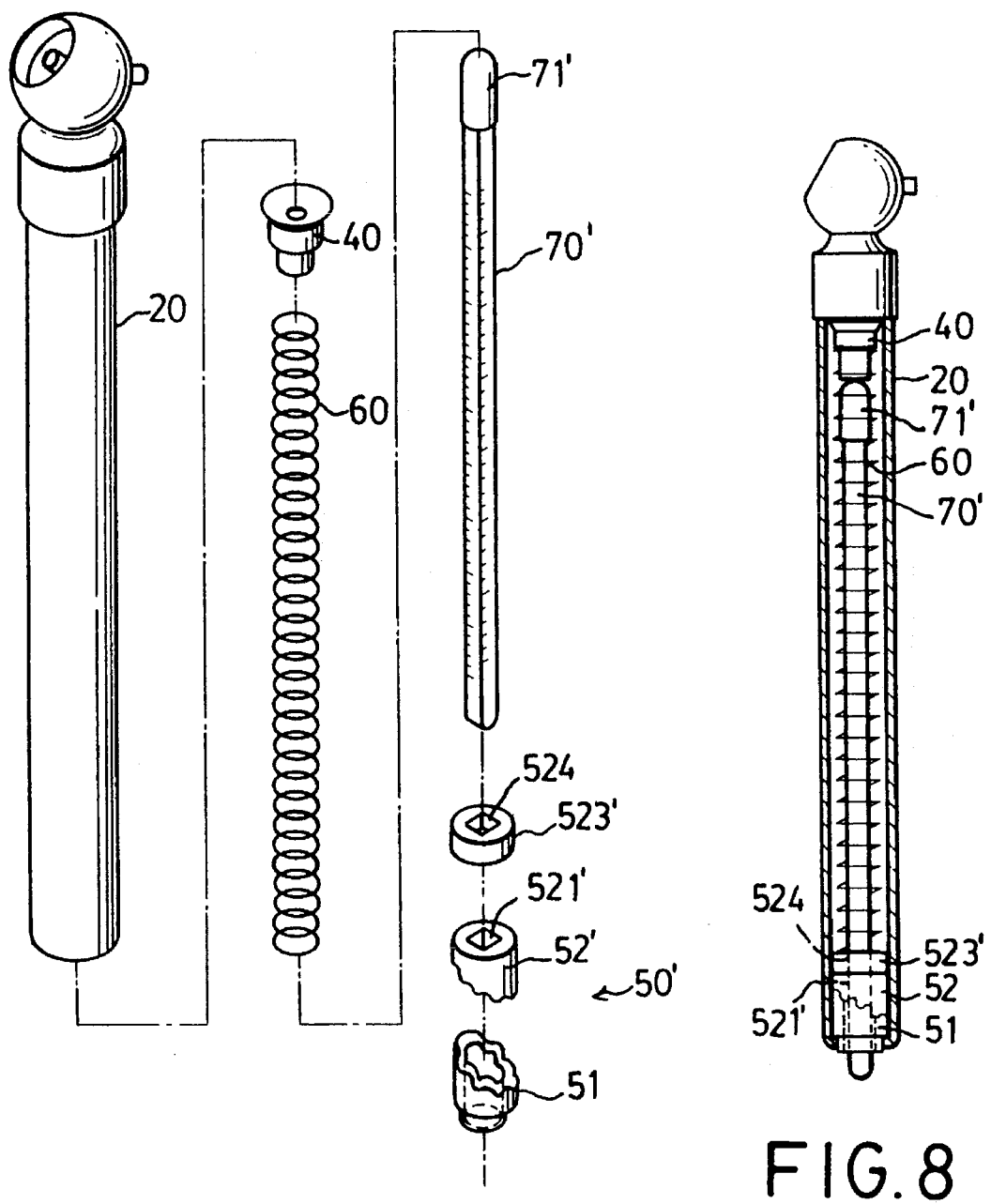
FIG. 7 is an exploded view showing the second preferred embodiment of a tunable tire pressure indicator of this invention.
FIG. 8 is a sectional view showing the tunable tire pressure indicator according the second embodiment of this invention.

FIGS. 7 and 8 show a modified plug unit 50' and a modified pressure indicating rod 70' of the second preferred embodiment of a tunable tire pressure indicator of this invention.

As shown, the pressure indicating rod 70' has a square cross section so that four sets (only two are shown in FIG. 7) of different measuring scales may be formed respectively on four side faces thereof for providing the pressure indicating rod 70' with added functions, and a diameter-increased cap 71' mounted on an upper end of the pressure indicating rod 70' for retaining the pressure indicating rod 70' in a casing 20 of the tunable tire pressure indicator.

Figure 9:
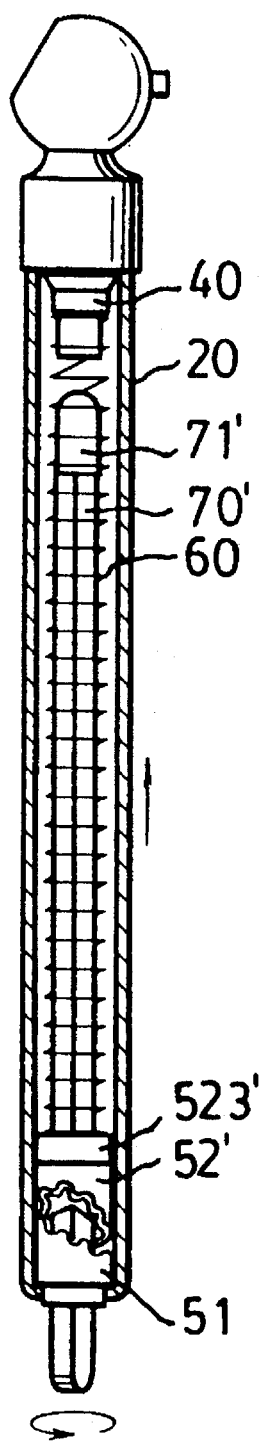
FIG. 9 is a schematic view illustrating how the tunable tire pressure indicator is operated in accordance with the second embodiment of this invention.

The plug unit 50' includes a stationary member 51 which is similar to the stationary member of the first embodiment, a movable member 52' which is substantially similar to the movable member of the first embodiment except for a mounting unit and an axial passage 521' of the movable member 52', and coupling means which is similar to the coupling means of the first embodiment for coupling adjustably and rotatably the movable member 52' to the stationary member 51. The axial passage 521' is substantially equal to the cross-section of the pressure indicating rod 70' to permit the pressure indicating rod 70' to extend slidably therethrough and to permit rotation of the movable member 52' with the pressure indicating rod 70', as shown in FIG. 9, so as to vary contact points between the stationary and movable members 51, 52'. Thus, the distance between the movable member 52' and the piston 40 of an be adjusted to adjust correspondingly initial spring force of the biasing member 60. The mounting unit includes a disc member 523' disposed on a top side of the movable member 52'. The disc member 523' has a central hole 524, as shown in FIG. 7, formed therethrough and communicated with the axial passage 521' to permit passage of the pressure indicating rod 70' therethrough. The central hole 524 is larger than the cross-section of the pressure indicating rod 70'. Thus, the lower end of the biasing member 60 can be inserted into and positioned within the central hole 524 of the disc member 523'.

Figure 10:
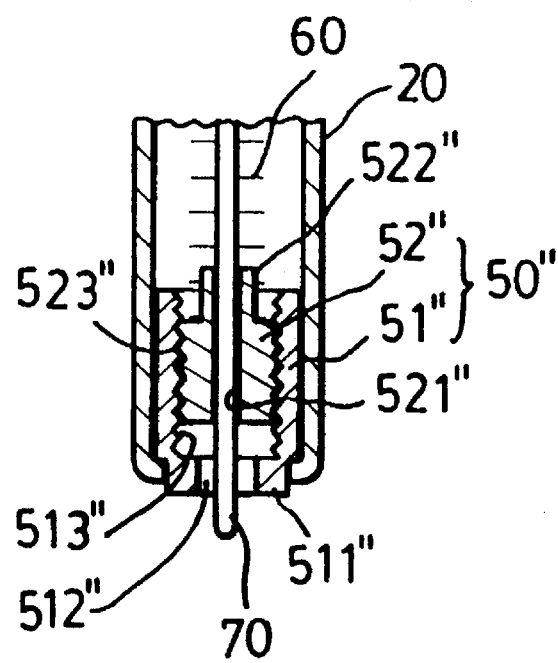
FIG. 10 is a schematic view showing a modified plug unit of the third preferred embodiment of a tunable tire pressure indicator of this invention.

FIG. 10 shows a modified plug unit 50" of the third embodiment of a tunable tire pressure indicator of this invention. As shown, the plug unit 50" includes a stationary member 51", a movable member 52" and coupling means.

The stationary member 51" is a tubular body which is plugged tightly into the lower end portion of the casing 20. The stationary member 51" has an inner wall surface which confines an axial through-hole, and a diameter-reduced lower portion 511" which has a central through-hole 512" larger than the cross-section of the pressure indicating rod 70 to permit passage of the pressure indicating rod 70 therethrough. The bottom end of the casing 20 is folded inwardly to clip tightly the lower portion 511" in order to further fix the stationary member 51" within the casing 20.

The movable member 52" is a cylindrical body which is mounted movably in the axial through-hole of the stationary member 51". The movable member 52" has an axial passage 521" which is substantially equal to the cross-section of the pressure indicating rod 70 so as to permit the pressure indicating rod 70 to extend slidably therethrough and so as to permit rotation of the movable member 52" with the pressure indicating rod 70. A mounting unit includes a pair of mounting arms 522" that project upwardly from a top side of the movable member 52" and that are to be inserted into the lower end of the biasing member 60 for positioning the latter. The mounting arms 522" are spaced apart from each other to confine a channel in alignment with the axial passage 521" to permit passage of the pressure indicating rod 70 therethrough.

The coupling means includes internal screw thread 513" formed on the inner wall surface of the stationary member 51", and external screw thread 523"0 formed on an outer peripheral wall of the movable member 52". The external screw thread 523" engages threadably the internal screw thread 513" to couple adjustably and rotatably the movable member 52" to the stationary member 51". Thus, axial rotation of the movable member 52– due to axial rotation of the pressure indicating rod 70 results in adjustment of the distance between the movable member 52" and the piston (not shown) of the tunable tire pressure indicator in order to adjust correspondingly initial spring force of the biasing member 60. In this way, tuning of the tire pressure indicator to obtain a precise tire pressure reading can be achieved by adjusting the initial spring force of the biasing member 60.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangement.

I claim:

1. A tunable tire pressure indicator, comprising:

an elongated hollow casing having upper and lower end portions;

a valve-actuating member mounted to said upper end portion of said casing and adapted to be connected to an inflating valve member of a tire;

a piston provided movably in said casing adjacent said valve-actuating member;

a plug unit mounted in said lower end portion of said casing;

a biasing member provided in said casing between said piston and said plug unit; and a pressure indicating rod disposed in said casing, said piston pushing said pressure indicating rod to extend out of said casing through said plug unit against action of said biasing member so as to provide a tire pressure reading in response to pressure entering said casing via said valve-actuating member;

said plug unit including: a movable member formed with an axial passage to permit said pressure indicating rod to extend slidably therethrough and to permit rotation of said movable member with said pressure indicating rod, said biasing member abutting against said movable member; a stationary member mounted securely in said lower end portion of said casing, said stationary member being formed with an axial through-hole larger than the cross-section of said pressure indicating rod to permit passage of said pressure indicating rod therethrough; and coupling means for coupling adjustably and rotatably said movable member to said stationary member to permit adjustment in distance between said movable member and said piston to adjust correspondingly initial spring force of said biasing member;

whereby, tuning of the tire pressure indicator to obtain a precise tire pressure reading can be achieved by adjusting the initial spring force of said biasing member.

2. The tunable tire pressure indicator as claimed in claim 1, wherein said stationary member has an inclined top end and said movable member has an inclined bottom end, said coupling means comprising a plurality of first teeth that project axially from said inclined top end of said stationary member and that provide said inclined top end with a wavy end face, and a plurality of second teeth that project axially from said inclined bottom end of said movable member and that provide said inclined bottom end with a wavy end face, said second teeth sliding along said first teeth to vary contact points between said stationary and movable members when said movable member rotates axially due to axial rotation of said pressure indicating rod, thereby adjusting the distance between said movable member and said piston to tune the tire pressure indicator.

3. The tunable tire pressure indicator as claimed in claim 1, wherein said axial coupling means comprises:

internal screw thread formed on an inner wall surface of said stationary member that confines said axial through-hole; and external screw thread formed on said movable member, said external screw thread engaging threadably said internal screw thread to couple adjustably and rotatably said movable member to said stationary member so that axial rotation of said movable member due to axial rotation of said pressure indicating rod results in adjustment of the distance between said movable member and said piston to tune the tire pressure indicator.

* * * * *